(12) United States Patent
Brodie et al.

(10) Patent No.: US 11,420,390 B2
(45) Date of Patent: Aug. 23, 2022

(54) SYSTEM FOR ADDITIVELY MANUFACTURING COMPOSITE STRUCTURE

(71) Applicant: Continuous Composites Inc., Coeur d'Alene, ID (US)

(72) Inventors: Marcus Raye Vincent Brodie, Erie, PA (US); Kyle Frank Cummings, Everett, WA (US); Andrew Michael Stulc, Spokane, WA (US); Nathan Andrew Stranberg, Post Falls, ID (US); Brock Jahner, Coeur d'Alene, ID (US); Stephen Tyler Wilson, Coeur D'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 122 days.

(21) Appl. No.: 16/842,611

(22) Filed: Apr. 7, 2020

(65) Prior Publication Data
US 2020/0238619 A1  Jul. 30, 2020

Related U.S. Application Data

(63) Continuation-in-part of application No. 16/516,113, filed on Jul. 18, 2019, now Pat. No. 11,358,331.
(Continued)

(51) Int. Cl.
*B29C 64/20*  (2017.01)
*B29C 64/264*  (2017.01)
(Continued)

(52) U.S. Cl.
CPC .......... *B29C 64/264* (2017.08); *B29C 64/106* (2017.08); *B29C 64/209* (2017.08); *B33Y 10/00* (2014.12); *B33Y 30/00* (2014.12)

(58) Field of Classification Search
CPC ... B29C 64/264; B29C 64/209; B29C 64/106; B29C 64/393; B29C 64/165; B33Y 10/00; B33Y 30/00
See application file for complete search history.

(56) References Cited

U.S. PATENT DOCUMENTS 3,286,305 A  11/1966  Seckel
3,809,514 A  5/1974  Nunez
(Continued)

FOREIGN PATENT DOCUMENTS

DE  4102257 A1  7/1992
EP  2589481 B1  1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Matthew J Daniels
*Assistant Examiner* — Shibin Liang
(74) *Attorney, Agent, or Firm* — Ryan C. Stockett

(57) ABSTRACT

An additive manufacturing system is disclosed for use in fabricating a structure. The additive manufacturing system may include a support, and a print head configured to discharge a material and being operatively connected to and moveable by the support in a normal travel direction during material discharge. The print head may include a module located at a trailing side of the discharging material relative to the normal travel direction and being configured to compact the material and expose the material to a cure energy at a tool center point.

19 Claims, 3 Drawing Sheets

Related U.S. Application Data

(60) Provisional application No. 62/981,515, filed on Feb. 25, 2020, provisional application No. 62/853,610, filed on May 28, 2019, provisional application No. 62/769,498, filed on Nov. 19, 2018.

(51) Int. Cl.
| | | |
|---|---|---|
| *B33Y 10/00* | | (2015.01) |
| *B29C 64/209* | | (2017.01) |
| *B29C 64/106* | | (2017.01) |
| *B33Y 30/00* | | (2015.01) |

(56) References Cited

U.S. PATENT DOCUMENTS

| | | | |
|---|---|---|---|
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,757,879 | B2 | 9/2017 | Engel |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 10,427,332 | B2 | 10/2019 | Engel |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0260110 | A1* | 10/2013 | Yasukochi .......... B29C 35/0894 428/195.1 |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2014/0300710 | A1* | 10/2014 | Shinoda ................ H04N 13/30 348/51 |
| 2015/0136455 | A1 | 5/2015 | Fleming |
| 2015/0165666 | A1* | 6/2015 | Butcher ................ B29C 64/165 428/373 |
| 2015/0273762 | A1 | 10/2015 | Okamoto |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | kiu |
| 2016/0136885 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |
| 2016/0200047 | A1 | 7/2016 | Mark et al. |
| 2016/0243762 | A1 | 8/2016 | Fleming et al. |
| 2016/0263806 | A1 | 9/2016 | Gardiner |
| 2016/0263822 | A1 | 9/2016 | Boyd |
| 2016/0263823 | A1 | 9/2016 | Espiau et al. |
| 2016/0271876 | A1 | 9/2016 | Lower |
| 2016/0297104 | A1 | 10/2016 | Guillemette et al. |
| 2016/0311165 | A1 | 10/2016 | Mark et al. |
| 2016/0325491 | A1 | 11/2016 | Sweeney et al. |
| 2016/0332369 | A1 | 11/2016 | Shah et al. |
| 2016/0339633 | A1 | 11/2016 | Stolyarov et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2016/0368255 | A1 | 12/2016 | Witte et al. |
| 2017/0001384 | A1 | 1/2017 | Eitzinger et al. |
| 2017/0007359 | A1 | 1/2017 | Kopelman et al. |
| 2017/0007360 | A1 | 1/2017 | Kopelman et al. |
| 2017/0007361 | A1 | 1/2017 | Boronkay et al. |
| 2017/0007362 | A1 | 1/2017 | Chen et al. |
| 2017/0007363 | A1 | 1/2017 | Boronkay |
| 2017/0007365 | A1 | 1/2017 | Kopelman et al. |
| 2017/0007366 | A1 | 1/2017 | Kopelman et al. |
| 2017/0007367 | A1 | 1/2017 | Li et al. |
| 2017/0007368 | A1 | 1/2017 | Boronkay |
| 2017/0007386 | A1 | 1/2017 | Mason et al. |
| 2017/0008333 | A1 | 1/2017 | Mason et al. |
| 2017/0015059 | A1 | 1/2017 | Lewicki |
| 2017/0015060 | A1 | 1/2017 | Lewicki et al. |
| 2017/0021565 | A1 | 1/2017 | Deaville |
| 2017/0028434 | A1 | 2/2017 | Evans et al. |
| 2017/0028588 | A1 | 2/2017 | Evans et al. |
| 2017/0028617 | A1 | 2/2017 | Evans et al. |
| 2017/0028619 | A1 | 2/2017 | Evans et al. |
| 2017/0028620 | A1 | 2/2017 | Evans et al. |
| 2017/0028621 | A1 | 2/2017 | Evans et al. |
| 2017/0028623 | A1 | 2/2017 | Evans et al. |

(56) References Cited

U.S. PATENT DOCUMENTS

| | | |
|---|---|---|
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kune et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0305041 A1 | 10/2017 | Engel |
| 2019/0202131 A1* | 7/2019 | Alfson .................. B33Y 50/02 |
| 2019/0283332 A1* | 9/2019 | Brown .................. B29C 64/20 |

FOREIGN PATENT DOCUMENTS

| | | |
|---|---|---|
| EP | 3124213 A1 | 2/2017 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Jul. 30, 2020 for PCT/US2020/031150 to Continuous Composites Inc. Filed May 1, 2020.

* cited by examiner

SYSTEM FOR ADDITIVELY MANUFACTURING COMPOSITE STRUCTURE

RELATED APPLICATION

This application is based on and claims the benefit of priority from 62/853,610 and 62/981,515 that were filed on May 28, 2019 and Feb. 25, 2020, respectively, the contents of all of which are expressly incorporated herein by reference. This application is also a continuation-in-part application of U.S. Non-Provisional application Ser. No. 16/516,113 that was filed on Jul. 18, 2019, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, Applicant has found that greater control over compacting and curing of the reinforcement can improve reinforcement placement, strength, and accuracy. The disclosed additive manufacturing system is uniquely configured to provide these improvements and/or to address other issues of the prior art.

SUMMARY

In one aspect, the present disclosure is directed to an additive manufacturing system. The additive manufacturing system may include a support, and a print head configured to discharge a material and being operatively connected to and moveable by the support in a normal travel direction during material discharge. The print head may include a module located at a trailing side of the discharging material relative to the normal travel direction and being configured to compact the material and expose the material to a cure energy at a tool center point.

In another aspect, the present disclosure is directed to another additive manufacturing system. This additive manufacturing system may include a support, and a print head configured to discharge a material and being operatively connected to and moveable by the support in a normal travel direction during material discharge. The print head may includes an outer cover located at a trailing side of the discharging material relative to the normal travel direction and being configured to roller over the material, and a source configured to direct the cure energy radially outward through the outer cover.

In yet another aspect, the present disclosure is directed to a method of additively manufacturing a structure. The method may include discharging a matrix-wetted continuous reinforcement through an outlet of a print head, and pressing a module against the matrix-wetted continuous reinforcement after discharging to compress the matrix-wetted continuous reinforcement. The method may also include directing cure energy radially outward through the module to the matrix-wetted continuous reinforcement being compressed.

DETAILED DESCRIPTION

Figure 1:
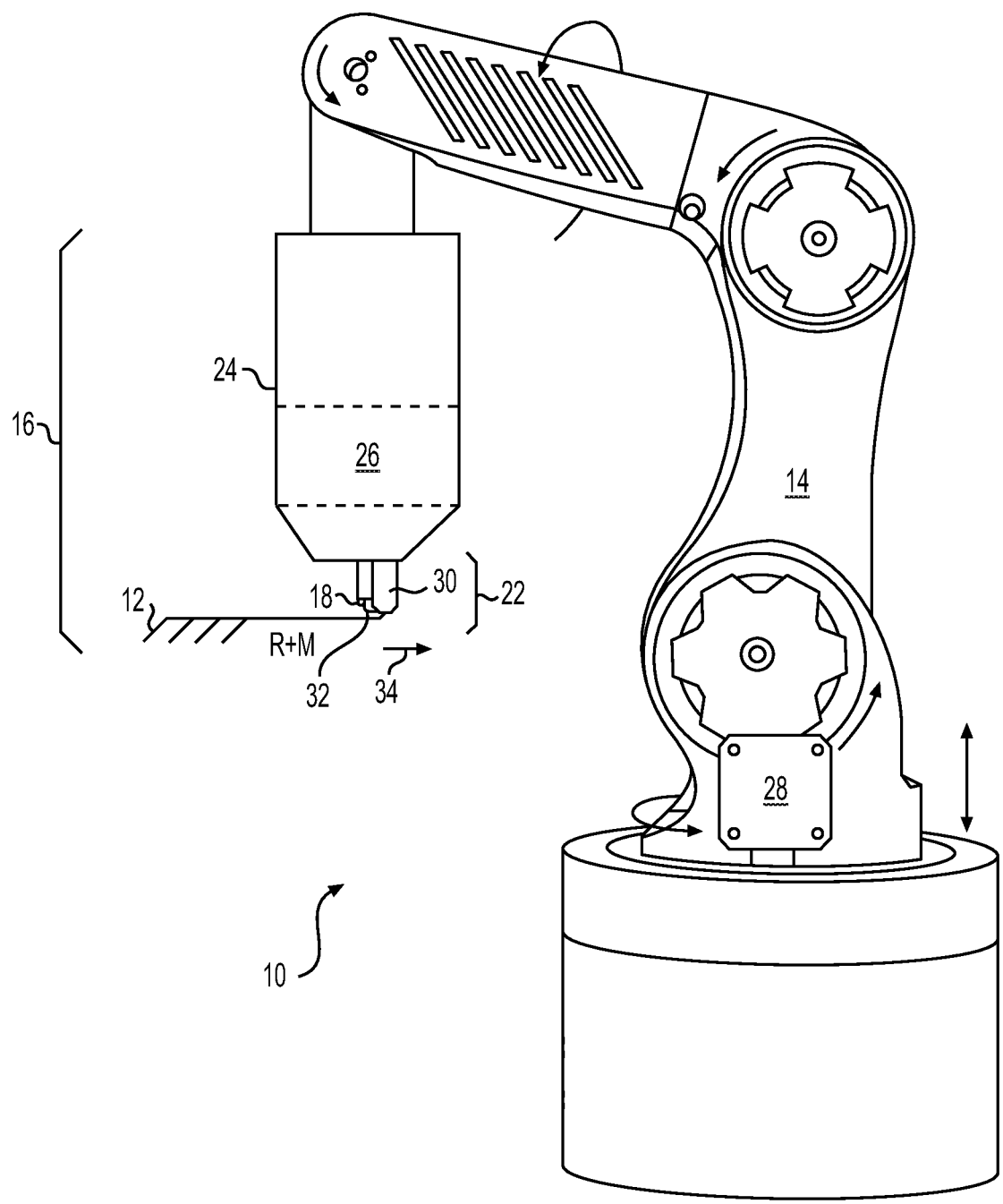
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and a deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an overhead-bridge or single-post gantry) or a hybrid gantry/arm also capable of moving head 16 in multiple directions during fabrication of structure 12. Although support 14 is shown as being capable of 6-axis movements relative to structure 12, it is contemplated that support 14 may be capable of moving head 16 in a different manner (e.g., along and/or around a greater or lesser number of axes). It is also contemplated that structure 12 could be associated with one more move movement axis and configured to move independent of and/or in coordination with support 14. In some embodiments, a drive may mechanically couple head 16 to support 14, and include components that cooperate to move portions of and/or supply power or materials to head 16.

Head 16 may be configured to receive or otherwise contain a matrix (shown as M). The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R). In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the matrix, polymerize the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is at least partially (e.g., completely) cured before the axial growth length becomes equal to an external diameter of the matrix-coated reinforcement.

The matrix and/or reinforcement may be discharged together from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the reinforcement is being pulled from head 16, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12, a fixture, etc.). For example, at the start of structure formation, a length of matrix-impregnated reinforcement may be pulled and/or pushed from head 16, deposited against the anchor point, and at least partially cured, such that the discharged material adheres (or is otherwise coupled) to the anchor point. Thereafter, head 16 may be moved away from the anchor point, and the relative movement may cause the reinforcement to be pulled from head 16. As will be explained in more detail below, the movement of reinforcement through head 16 may be selectively assisted via one or more internal feed mechanisms, if desired. However, the discharge rate of reinforcement from head 16 may primarily be the result of relative movement between head 16 and the anchor point, such that tension is created within the reinforcement. As discussed above, the anchor point could be moved away from head 16 instead of or in addition to head 16 being moved away from the anchor point.

Head 16 may include, among other things, an outlet 22 and a matrix reservoir 24 located upstream of outlet 22. In one example, outlet 22 is a single-channel outlet configured to discharge composite material having a generally circular, tubular, or rectangular cross-section. The configuration of head 16, however, may allow outlet 22 to be swapped out for another outlet that discharges multiple channels of composite material having the same or different shapes (e.g., a flat or sheet-like cross-section, a multi-track cross-section, etc.). Fibers, tubes, and/or other reinforcements may pass through matrix reservoir 24 (e.g., through one or more internal wetting mechanisms 26 located inside of reservoir 24) and be wetted (e.g., at least partially coated, encased, and/or fully saturated) with matrix prior to discharge.

Outlet 22 may take different forms. In one example, a guide or nozzle 30 is located downstream of wetting mechanism 26, and a compactor 32 trails nozzle 30 (e.g., relative to a normal travel direction of head 16 during material discharge, as represented by an arrow 34). It is contemplated that either of nozzle 30 or compactor 32 may function as a tool center point (TCP) of head 16, to affix the matrix-wetted reinforcement(s) at a desired location prior to and/or during curing when exposed to energy by cure enhancer(s) 18. It is also contemplated that nozzle 30 may omitted, in some embodiments. Finally, it is contemplated that the TCP of head 16 may not necessarily be associated with nozzle 30 or compactor 32 and instead be a location of cure energy exposure that is separate from these locations. The TCP may also switch locations in some applications.

One or more controllers 28 may be provided and communicatively coupled with support 14 and head 16. Each controller 28 may embody a single processor or multiple processors that are programmed and/or otherwise configured to control an operation of system 10. Controller 28 may include one or more general or special purpose processors or microprocessors. Controller 28 may further include or be associated with a memory for storing data such as, for example, design limits, performance characteristics, operational instructions, tool paths, and corresponding parameters of each component of system 10. Various other known circuits may be associated with controller 28, including power supply circuitry, signal-conditioning circuitry, solenoid driver circuitry, communication circuitry, and other appropriate circuitry. Moreover, controller 28 may be capable of communicating with other components of system 10 via wired and/or wireless transmission.

One or more maps may be stored within the memory of controller 28 and used during fabrication of structure 12. Each of these maps may include a collection of data in the form of lookup tables, graphs, and/or equations. In the disclosed embodiment, the maps may be used by controller 28 to determine movements of head 16 required to produce desired geometry (e.g., size, shape, material composition, performance parameters, and/or contour) of structure 12, and to regulate operation of cure enhancer(s) 18 and/or other related components in coordination with the movements.

Figure 2:
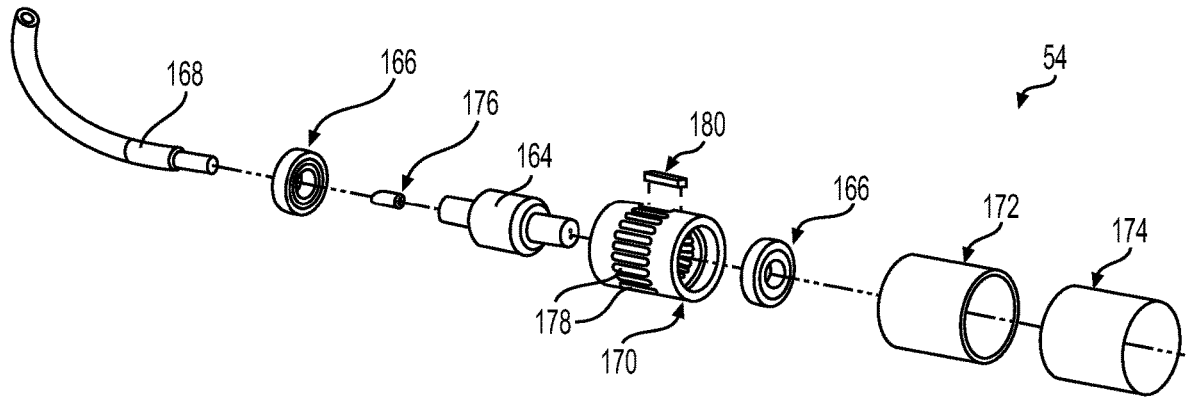
FIGS. 2, 3, and 4, are isometric, diagrammatic, and cross-sectional illustrations, respectively, of exemplary disclosed portions of the system of FIG. 1.
Figure 3:
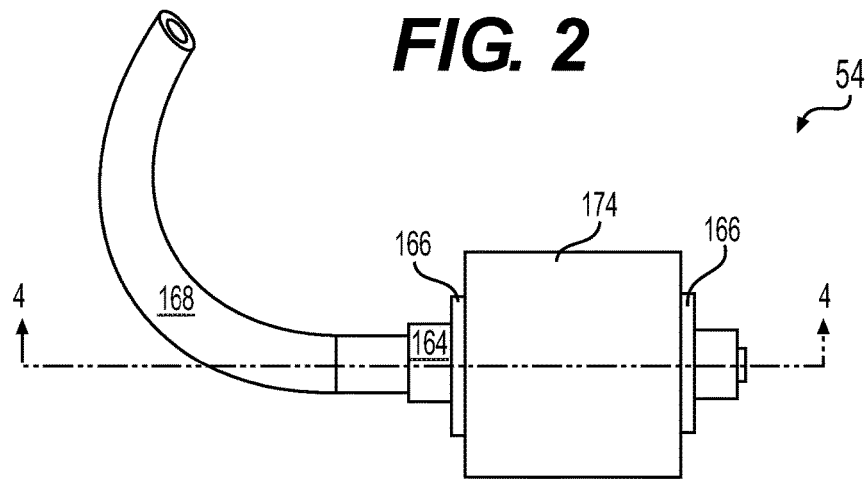
Figure 4:
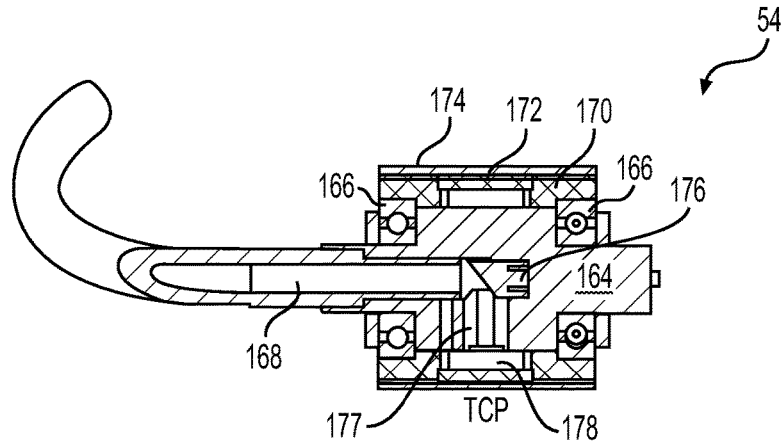

As shown in FIGS. 2, 3, and 4, cure enhancer(s) 18 and compactor 32 may be integrated into a module 54, which is capable of performing both curing and compacting functions. As shown in these figures, module 54 may be a self-contained assembly of multiple components including, among other things, a shaft 164 that is rotationally mounted to the rest of head 16 via spaced-apart bearings 166, a source 168 configured to direct cure energy (e.g., light) into shaft 164, a distributor 170 positioned around shaft 164, and one or more covers (e.g., an inner compliant cover 172 and/or an outer protective cover 174) mounted over distributor 170 that provide compaction forces against discharging material. The energy directed axially into shaft 164 may be disbursed, focused, and/or redirected radially outward by an optic (e.g., a baffle, a lens, a mirror, a polished bore or end wall, etc.) 176 located at an internal end of shaft 164 and one or more radial passages 177 (shown only in FIG. 4) formed within shaft 164. The energy may pass through one or more axially extending circumferential slots 178 of distributor 170 and then through the associated cover(s), which may be at least partially transparent (e.g., about 70-100% transparent) to the energy (e.g., light energy at about 350-450 nm wavelength, such as a wavelength of about 405 nm). In some embodiments, one or more of slots 178 may be fitted with a transparent spacer 180 that helps to support the cover(s). In some embodiments, spacer 180 may itself be an optic, functional to focus, amplify, disburse, and/or aim the energy from source 168.

In some applications, module 54 (e.g., the outer surface of cover 174) may form the TCP of head 16. In these applications, head 16 may be nozzle-less. Accordingly, the TCP of head 16 may correspond with an axially oriented line of contact between the outer surface of cover 174 and an active surface (e.g., where module 54 pushes the wetted-reinforcements onto the surface) of structure 12. It should be noted that the line of contact may shift, for example as head 16 is tilted by support 14 (referring to FIG. 1) relative to the print surface and/or relative to a travel direction (e.g., if printing into free-space).

In one embodiment, outer cover 174 may be fabricated from a low-friction material (e.g., Polytetrafluoroethylene—PTFE, Fluorinated ethylene propylene—FEP, etc.). In one example, FEP may be utilized for outer cover 174, due to its greater transparency when compared with PTFE.

The compliance of inner cover 172 may allow for adequate engagement and compression forces on the reinforcement, without requiring great accuracy in the positioning of module 54. The compliance of inner cover 172 may also result in a flat spot at an area of engagement with structure 12 (See FIG. 6). This flat spot may help the matrix-wetted reinforcement disengage from module 54 and adhere to only structure 12, and also help the reinforcement to lay flatter against an underlying layer of structure 12. In addition, the compliance of inner cover 172 may allow a cutting device (described in more detail below, in reference to FIGS. 5 and 6) to push a distance into module 54, thereby improving a severing performance Outer cover 174 may need to be periodically replaced due to its engagement with the cutting device. In one embodiment, inner cover 172 may have a hardness of about 20-50 A-Shore (e.g., about 40 A-Shore), and outer cover 174 may have a greater hardness (e.g., at least 5-10% greater than the hardness of inner cover 172) to increase longevity during cutting. A thickness of outer cover 174 may be less than a thickness of inner cover 172, such that the compliance of inner cover 172 may still be effective through the harder outer cover 174. For example, outer cover 174 may be about $\frac{1}{5}$-$\frac{1}{25}$ a thickness of inner cover 172. In some embodiments, outer cover 174 may have a lower friction than inner cover 172, helping to inhibit undesired sticking of the matrix-wetted reinforcement to module 54.

Because energy may be directed through module 54 to the matrix-wetted reinforcement, curing at (e.g., just before, directly over, and/or just behind) the TCP may be possible. It is contemplated that enough curing may take place to tack the reinforcement before little, if any, movement of the reinforcement away from the TCP location has occurred. This may improve placement accuracy of the reinforcement. It is also contemplated that the matrix may be cured only at an outer surface (e.g., enough to tack and/or maintain a desired shape) or that the matrix may be through-cured via exposure to only the energy from source 168 (in addition to or without any extraneous environmental exposure). In the former instance, additional energy exposure (e.g., oven baking, autoclave heating, etc.) after completion of structure 12 may be required.

In one embodiment, geometry of distributor 170 may be selected to focus the energy from source 168 at only the TCP (i.e., in conjunction with the location and orientation of radial passage 177). For example, the geometry may allow energy from source 168 to pass through only the one slot 178 located nearest (e.g., at) the TCP, while inhibiting energy from passing through the other slots 178 that are further away from the TCP at a given time. A thicker walled distributor having narrower slots 178 may produce a more focused exposure area. In the disclosed example, slot 178 may have an axial length of about 0-2 times a width of the reinforcement passing over distributor 170.

Figure 5:
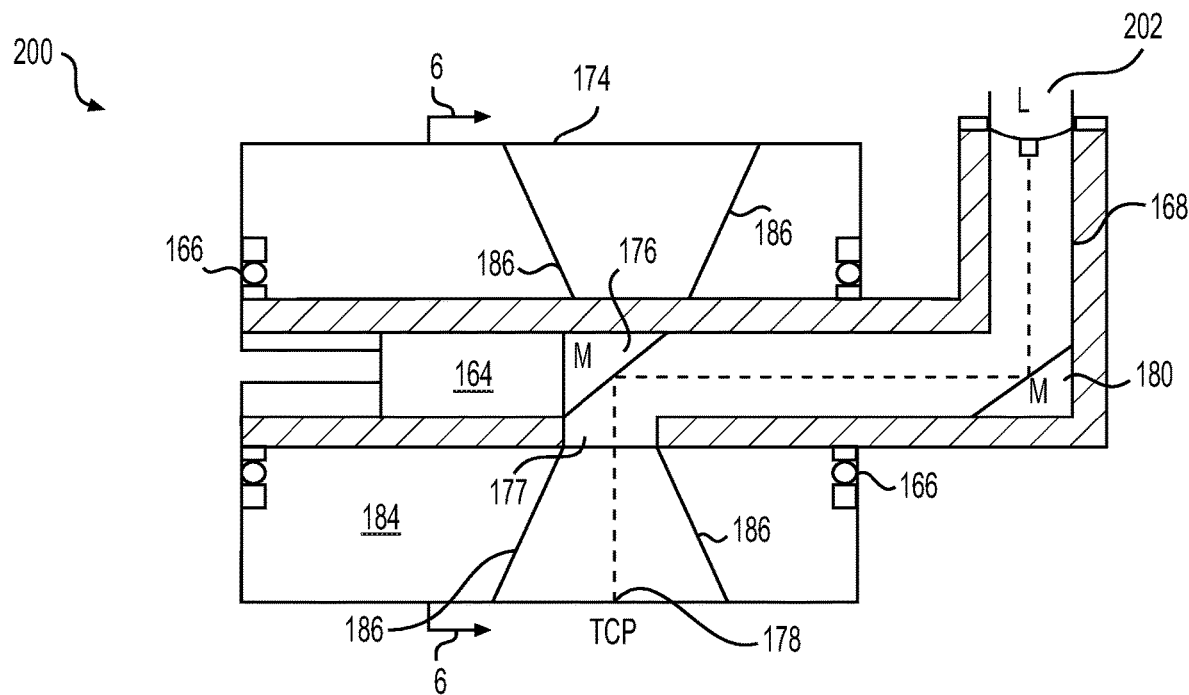
FIGS. 5 and 6 are cross-sectional illustrations of other exemplary disclosed portions of the system of FIG. 1.
Figure 6:
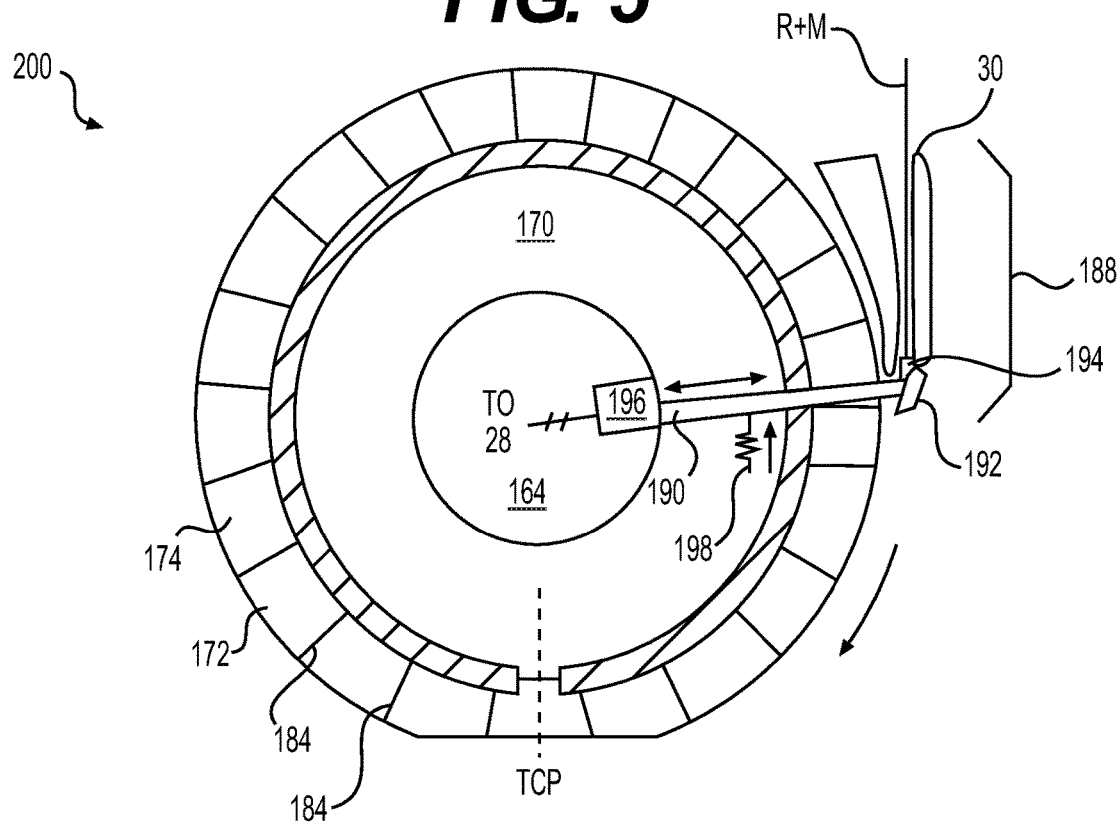

FIGS. 5 and 6 illustrate another module 200 that integrates curing and compacting functions, among others. Like module 54 of FIGS. 2-4, module 200 of FIGS. 5 and 6 includes shaft 164 rotationally connected to the rest of head 16 via bearings 166, and source 168 directing cure energy (e.g., energy from a UV light, laser, or other cure energy source 202) axially into shaft 164. The energy may be redirected radially outward through inner and outer covers 172, 174 to the TCP of head 16 via optic 176 located an internal end of shaft 164 and passage 177. In one embodiment, the TCP is located at an axial center of distributor 170 (shown in FIG. 5). It is contemplated, however, that the TCP could be positioned closer to an end of distributor 170, if desired.

Like module 54, module 200 may be configured to inhibit energy dissipation and loss as it passes radially outward through inner and outer covers 172, 174. However, module 200 may do so without the use of distributor 170, slots 178, and spacers 180. Instead, inner and/or outer covers 172, 174 of module 200 may be segmented via one or more dividers 184. Dividers 184 may be generally planar, clocked at regular spading from each other, and oriented through an axis of compacting device 150. Dividers 184 may extend radially inward through outer and inner covers 174, 172, but terminate short of or at shaft 164. Dividers 184 may be fabricated from or otherwise coated, tinted, or infused with a material configured to block or reflect the energy from source 168 toward the TCP. Any number of dividers 184 may be utilized to create as many separated energy-transmitting channels (e.g., arcuate segments between adjacent dividers 184) as desired. In addition to dividers 184, it is contemplated that one or more dividers 186 lying in a plane generally orthogonal to or oriented at an oblique angle relative to the axis of shaft 164 may be used to further focus the energy from source 168 (e.g., to direct the energy axially toward the TCP), in some embodiments. In some applications, the spacing between dividers 184 and/or 186 may be adjustable during material discharge to selectively vary and focus cure path parameters.

FIG. 6 also illustrates module 200 as additionally having cutting functionality. For example, a cutting mechanism 188 may be incorporated into module 200, in some embodiments. Cutting mechanism 188 may include components that cooperate to clamp, cut, and/or feed reinforcements during and/or after a printing operation. These components may include, among other things, a bar 190 that is pivotally mounted at opposing axial ends to shaft 164, a blade 192 affixed to an outer rail 194 of bar 190, and one or more actuators (e.g., a linear actuator at each end of shaft 164) 196 configured selectively extend and retract outer rail 194 in a radial direction.

During operation, the reinforcement may be discharged through nozzle 30 and at least partially wrapped around outer cover 174 of module 200 to a nip point at the TCP. Cure energy may pass axially into compacting module 200 and then be redirected radially outward to cure the matrix coating the reinforcement at the TCP. When it is desired to sever the reinforcement (e.g., at the end of a printing pass), actuator(s) 196 may be energized by controller 28 (referring to FIG. 1), causing bar 190 to be retracted radially inward. This action may cause the reinforcement to be pinched between outer rail 194 and outer cover 174, thereby clamping the reinforcement at the position shown in FIG. 6. During the retraction and clamping of bar 190, blade 192 may be forced through the reinforcement and against outer cover 174, thereby severing the reinforcement.

Bar 190 may remain in the clamped position during start of a next printing pass and, due to its engagement with outer cover 174 of module 200, be rotated therewith. This rotation may function to pull the reinforcement out of head 16 (e.g., out through nozzle 30, in preparation for printing) and continue until outer rail 194 reaches the TCP, at which time bar 190 may be pushed and/or released to move back radially outward, allowing rail 194 to be rotated back to the outlet of nozzle 30. It is contemplated that the return of rail 194 may be facilitated with another actuator (not shown) and/or a spring 198, as desired. With this configuration, not only is clamping and cutting of the reinforcement provided, but guidance of the severed reinforcement to the TCP may also be facilitated.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, severing locations, curing specifications, compaction specifications, etc. It should be noted that this information may alternatively or additionally be loaded into system 10 at different times and/or continuously during the manufacturing event, if desired. Based on the component information, one or more different reinforcements and/or matrix materials may be installed and/or continuously supplied into system 10.

To install the reinforcements, individual fibers, tows, and/or ribbons may be passed through matrix reservoir 24 and outlet 22 (e.g., through features of nozzle 30, and under compactor 32). In some embodiments, the reinforcements may also need to be connected to a pulling machine (not shown) and/or to a mounting fixture (e.g., to the anchor point). Installation of the matrix material may include filling head 16 (e.g., wetting mechanism 26 of reservoir 24) and/or coupling of an extruder (not shown) to head 16.

The component information may then be used to control operation of system 10. For example, the in-situ wetted reinforcements may be pulled and/or pushed from outlet 22 of head 16 as support 14 selectively moves (e.g., based on known kinematics of support 14 and/or known geometry of structure 12), such that the resulting structure 12 is fabricated as desired.

Operating parameters of support 14, cure enhancer(s) 18, compactor 32, modules 54 and/or 200, and/or other components of system 10 may be adjusted in real time during material discharge to provide for desired bonding, strength, tension, geometry, and other characteristics of structure 12. Once structure 12 has grown to a desired length, structure 12 may be severed from system 10.

It will be apparent to those skilled in the art that various modifications and variations can be made to the disclosed system. Other embodiments will be apparent to those skilled in the art from consideration of the specification and practice of the disclosed system. For example, although components of system 10 (e.g., distributor 170, covers 172 and 174, spacers 180, dividers 184 and 186, etc.) have been described and shown as separate components, it is contemplated that two or more components of system 10 could alternatively be integrated, if desired. It is intended that the specification and examples be considered as exemplary only, with a true scope being indicated by the following claims and their equivalents.

What is claimed is:

1. An additive manufacturing system, comprising:
   a support; and
   a print head configured to discharge a material and being operatively connected to and moveable by the support in a normal travel direction during material discharge, wherein:
      the print head includes a module located at a trailing side of the discharging material relative to the normal travel direction, the module having a compactor configured to compact the material and to simultaneously expose the material to a cure energy at a tool center point;
      the module is rotationally connected to a remainder of the print head; and
      the cure energy is directed into the compactor from outside of the compactor.

2. The additive manufacturing system of claim 1, further including at least one divider aligned with an axis of the module and configured to focus the cure energy to an arcuate segment of the module.

3. The additive manufacturing system of claim 1, further including at least one divider extending radially outward through the module and configured to focus the cure energy in an axial direction of the module.

4. The additive manufacturing system of claim 1, wherein the module includes:
   an outer cover configured to roll over the material during compaction;
   an arm extending radially outward past the outer cover;
   a bar connected to a distal end of the arm and extending in an axial direction of the module; and
   an actuator connected to the arm and configured to selectively pull the bar radially inward against the outer cover.

5. The additive manufacturing system of claim 4, further including a cutting device operatively connected to the bar.

6. The additive manufacturing system of claim 1, wherein the tool center point is a nip point of a compactor.

7. An additive manufacturing system, comprising:
   a support; and
   a print head configured to discharge a material and being operatively connected to and moveable by the support in a normal travel direction during material discharge, wherein:
      the print head includes a module located at a trailing side of the discharging material relative to the normal travel direction and being configured to compact the material and to simultaneously expose the material to a cure energy at a tool center point; and
      the module includes:
         an outer cover configured to move against the material during compaction; and
         a source configured to direct the cure energy from outside of the outer cover into the outer cover and radially outward through the outer cover.

8. The additive manufacturing system of claim 7, wherein:
   the module includes a shaft on which the outer cover is mounted; and
   the source is configured to direct the cure energy from outside of the module axially into the shaft and then radially outward through the outer cover via a passage in the shaft.

9. The additive manufacturing system of claim 8, further including an optic mounted inside of the shaft and configured to redirect the cure energy directed axially into the shaft radially outward.

10. The additive manufacturing system of claim 8, further including a slotted distributor disposed between the shaft and the outer cover and configured to rotate about the shaft together with the outer cover.

11. The additive manufacturing system of claim 10, wherein:
    the slotted distributor includes a plurality of axially oriented slots; and
    the module further includes a spacer that is at least partially transparent to the cure energy disposed within each of the plurality of axially oriented slots.

12. The additive manufacturing system of claim 10, further including an inner cover disposed between the slotted distributor and the outer cover, wherein the inner cover is more compliant than the outer cover.

13. The additive manufacturing system of claim 12, wherein each of the inner and outer covers is at least partially transparent to the cure energy.

14. The additive manufacturing system of claim 12, wherein the outer cover has a hardness that is 5-10% greater than a hardness of the inner cover.

15. An additive manufacturing system, comprising:
    a support; and
    a print head configured to discharge a material and being operatively connected to and moveable by the support in a normal travel direction during material discharge, wherein the print head includes:
       an outer cover located at a trailing side of the discharging material relative to the normal travel direction and being configured to move against the material; and
       a source configured to direct cure energy from outside of the outer cover axially into the outer cover and radially outward through the outer cover.

16. The additive manufacturing system of claim 15, further including a shaft on which the outer cover is mounted, wherein the source is configured to direct the cure energy axially into the shaft and then radially outward through the outer cover via a passage in the shaft.

17. The additive manufacturing system of claim 16, further including an optic mounted inside of the shaft and configured to redirect the cure energy directed axially into the shaft radially outward.

18. The additive manufacturing system of claim 17, further including a slotted distributor disposed between the shaft and the outer cover and configure to rotate with the outer cover.

19. The additive manufacturing system of claim 15, further including at least one divider configured to focus the cure energy to an arcuate segment.

* * * * *